United States Defensive Publication

[19] (H) [11] T957,004

Dieter et al. [43] Apr. 5, 1977

[54] ELECTROPHORETIC DEPOSITION OF STYRENE-MALEIC ANHYDRIDE COPOLYMERS

[75] Inventors: Jerry A. Dieter, Park Forest; Robert C. Strand, Homewood, both of Ill.

[73] Assignee: Atlantic Richfield Company, New York, N.Y.

[21] Appl. No.: 718,305

[22] Filed: Aug. 26, 1976

Related U.S. Application Data

[60] Continuation of Ser. No. 479,012, June 13, 1974, which is a continuation of Ser. No. 264,215, June 19, 1972, which is a division of Ser. No. 834,540, June 18, 1969.

[51] Int. Cl.$^2$ ..... C25D 13/06

[52] U.S. Cl. ..... 204/181

[57] ABSTRACT

An electrophoretic coating composition bath based on styrene-maleic anhydride copolymer is disclosed. The electrophoretic coating composition bath comprises a dispersion in water of an at least partially neutralized, partial ester of styrene-maleic anhydride copolymer, a cross-linking agent for the styrene-maleic anhydride copolymer, e.g., melamine-formaldehyde resin, and a neutralization agent for said styrene-maleic anhydride copolymer. The styrene-maleic anhydride copolymer has an about 1:1 to 4:1 molar ratio of styrene to maleic anhydride. The copolymer has a molecular weight of about 500 to 4,000 and is esterified to an acid number in the range of about 20 to 350. The copolymer is esterified to about 25 to 125% half-ester and neutralized to about 20 to 100% based on the esterified resin. The neutralizing agent suitable for use in the present invention can be for example, alkali metal hydroxides, ammonia, lower aliphatic amines, and lower aliphatic hydroxy amines. The bath can contain a coupling agent which is preferably a glycol ether, such as monopropylether of propylene glycol and n-butyl ether of ethylene glycol, or water-soluble solvent for the resin, e.g., n-butanol, propanol and cyclohexanol, or water-insoluble solvent, such as toluene xylene and mineral hydrocarbon solvents. The electrophoretic deposition process comprises passing a direct electric current through the electrophoretic coating composition bath to an object having a conductive surface which is immersed in said bath and connected as the anode in the system.

3 Claims, No Sheets Drawing,

24 Pages Specification

The file of this unexamined application may be inspected and copies thereof may be purchased (849 O.G. 1221, Apr. 9, 1968).